(12) United States Patent
Sinsabaugh et al.

(10) Patent No.: US 7,472,865 B2
(45) Date of Patent: Jan. 6, 2009

(54) DEHUMIDIFICATION SYSTEM FOR AN AIRSHIP

(75) Inventors: Steven L. Sinsabaugh, Uniontown, OH (US); Ann M. Dirling, Avon, OH (US); Kurtis D. Kandel, Louisville, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 377 days.

(21) Appl. No.: 11/228,652

(22) Filed: Sep. 15, 2005

(65) Prior Publication Data

US 2007/0057116 A1    Mar. 15, 2007

(51) Int. Cl.
*B64B 1/02*    (2006.01)

(52) U.S. Cl. .............................. 244/30; 244/29; 244/31; 244/96; 244/97; 244/98; 244/99

(58) Field of Classification Search ............. 244/29–31, 244/94–99; D23/359
See application file for complete search history.

(56) References Cited

U.S. PATENT DOCUMENTS

| | | | | |
|---|---|---|---|---|
| 4,109,704 A | * | 8/1978 | Spethmann | 165/249 |
| 5,090,637 A | * | 2/1992 | Haunschild | 244/97 |
| 5,199,667 A | * | 4/1993 | Fujii | 244/93 |
| 5,386,952 A | * | 2/1995 | Nordstrom et al. | 244/118.1 |
| 5,806,323 A | * | 9/1998 | Bevier | 62/91 |
| 5,984,002 A | * | 11/1999 | Kido et al. | 165/228 |
| 6,508,264 B2 | * | 1/2003 | Chaffee | 137/223 |
| 6,966,197 B2 | * | 11/2005 | Itoh et al. | 62/324.1 |
| 7,156,342 B2 | * | 1/2007 | Heaven et al. | 244/30 |
| 2004/0155149 A1 | * | 8/2004 | Dossas et al. | 244/128 |
| 2005/0074359 A1 | * | 4/2005 | Krieger et al. | 422/28 |

\* cited by examiner

*Primary Examiner*—Michael R Mansen
*Assistant Examiner*—Philip J Bonzell
(74) *Attorney, Agent, or Firm*—Renner Kenner Greive Bobak Taylor & Weber

(57) ABSTRACT

A dehumidification system for removing water vapor from the within the envelope of an airship comprises a pressurizer valve, a blower and a dehumidifier attached to the airship. The pressurizer valve releases air from the envelope and directs the air to the blower. The blower forces the air through the dehumidifier where the air is dried to a desired dew point. The dried air is then forced back into the envelope of the airship, thus reducing the weight of the airship and reducing the amount of condensate that may form during an ascent.

2 Claims, 3 Drawing Sheets

DEHUMIDIFICATION SYSTEM FOR AN AIRSHIP

GOVERNMENT LICENSE RIGHTS

The U.S. Government may have a paid-up license in this invention and the right in limited circumstances to require the patent owner to license others on reasonable terms as provided for by the terms of Contract No. HQ0006-04-9-0001 awarded by the Missile Defense Agency—Department of Defense.

TECHNICAL FIELD

Generally, the present invention relates to a dehumidification system for an airship. Specifically, the present invention relates to a dehumidification system for an airship that can dry the air within an envelope of the airship to a desired dew point. Particularly, the present invention is directed to a dehumidification system for an airship that prevents the water vapor contained within the envelope of a high altitude airship from entering a liquid phase during ascent of the airship.

BACKGROUND

As an airship moves between ground level and high altitude, various thermal changes are encountered due to the fact that external atmospheric temperature decreases as altitude increases. Thus, as the airship ascends from ground level, the temperature decreases resulting in a cooling of the walls of the hull or envelope of the airship. The rate at which the temperature decreases with increased altitude is referred to as the temperature lapse rate. As the walls of the hull decrease in temperature, sites for water condensation are created. Furthermore, as the air within the envelope continues to cool down to its dew point temperature, the water vapor in the air contained in the hull of the airship begins to condense into water. As this condensed water accumulates it may contribute to several unwanted problems discussed below.

To control the descent and ascent of an airship, conventional airships generally use ballonets or storage balloons contained within the envelope of the conventional airship. These ballonets separate the helium volume of the airship from the air volume. In addition, the ballonets, which have a much smaller volume than that of the envelope, inflate and deflate with air to control the trim and buoyancy of the airship. In fact, during descent of the airship from altitude, atmospheric air, external to the airship, is blown into the ballonets to bring the airship to the ground. Thus, conventional airships, because of the relatively small size of the ballonets, have a small quantity of air that includes water vapor. As such, the water vapor contributes only a small percentage of potential additional weight to the payload of the conventional airship. Since conventional airships and aerostats fly at relatively low altitudes, the change in temperature due to the temperature lapse rate is relatively small, which minimizes the amount of water condensation that forms on the interior surfaces of the air volume of the hull, and reduces the formation of ice fog within the air volumes of the hull as well.

In contrast to a conventional airship, the hull or envelope of a high altitude airship has a much larger air volume than that of the ballonets of a conventional airship. For example, the envelope of a high altitude airship may be on the order of five million cubic feet. In further contrast to the conventional airship, the high altitude airship will experience an extreme decrease in external air temperature due to the temperature lapse rate as it ascends from ground level to flight altitude. In similar fashion to a conventional airship, the high altitude airship uses external atmospheric air that is blown into the envelope to decrease buoyancy, causing the high altitude airship to descend. As the high altitude airship descends and intakes external ambient air, the water content of the air represents a significant mass addition, if condensed.

Water vapor within the hull of the airship may condense into either liquid or solid form in several manners, as the external air temperature decreases during the ascent of the airship. For example, water can condense on the inside surface of the hull or envelope of the airship, as the envelope temperature decreases due to the change in external air temperature and radiation of heat from the hull. As the internal surface of the envelope cools below the dew point or frost point of the internal air volume, liquid water or ice will form on the inside surfaces of the envelope. This can occur on the surfaces of structures mounted to the envelope of the airship that are exposed to the internal air volume, such as air blowers, air valves, check valves and air sensors. In addition, in the bulk internal air volume of the envelope, water can condense in the form of liquid water droplets. These water droplets tend to settle out on the internal surfaces of the envelope in liquid form. Yet another manner in which water can condense within the envelope of the high altitude airship is in the form of ice crystals. The formation of ice crystals occurs when the internal water partial pressure and air temperature are such that the water can convert directly (sublimate) from its vapor phase to its solid phase in the form of extremely fine ice crystals, sometimes referred to as ice fog. It should be noted that the ice crystals of ice fog tend to remain suspended in the air volume of the envelope of the airship.

High altitude airships may use a number of cells within the envelope to separate the lifting gas, such as helium, from the air that is used to maintain the shape and rigidity of the airship at altitudes below flight altitude, and to control the buoyancy of the airship to perform ascents and descents. The cells comprise a flexible and pliable material used to retain the lifting gas in discrete regions. As the high altitude airship ascends and descends, the material of the cells deflates or inflates in accordance with the change in altitude of the high altitude airship. Thus, during an ascent, the flexible and pliable material of the cells changes shape, which may result in the trapping of condensed water between the material of the cell and the inner wall of the envelope of the high altitude airship. This entrapped water may be in the form of ice or liquid that condensed upon the interior surfaces of the envelope or other components of the airship, or that has formed in the bulk air volume of the envelope and has settled onto the interior surfaces thereof. Furthermore, because of the large volume of air contained in the envelope, a large quantity of water may be condensed and trapped. Because of the trapping, the water cannot be easily evacuated out of the envelope through the various air valves carried by the envelope. Without any means of evacuating the trapped water, the water may continue to accumulate within the envelope, adding a significant amount of additional weight to the high altitude airship. Moreover, as the high altitude airship continues to ascend, the trapped water may freeze to form ice, which is very difficult to remove from the envelope.

This water content, if allowed to condense within the envelope of the airship during an ascent, could become entrapped and create several potential problems that may affect airship performance. For example, the entrapped water mass may reduce the payload capacity of the airship, reduce the flight altitude of the airship, and/or adversely affect the trim of the airship. Furthermore, the entrapped water can form ice that may interfere with the proper operation of the air pressurization blowers, vent valves, check valves and sensors. Moreover, an uncertainty in the altitude, performance, trim, and control of the airship will result because the mass of the entrapped water will continually vary due to the environmental fluctuations of the ambient external air used within the envelope of the airship.

Therefore, there is a need for a dehumidification system for an airship to prevent water condensation and ice formation within the envelope during ascent of the airship. And there is a need for a dehumidification system for an airship to reduce the amount of water vapor or humidity contained in the envelope of an airship prior to an ascent. Additionally, there is a need for a dehumidification system that is able to lower the dew point of the air contained within the envelope to a point where the water vapor in the air avoids the liquid phase, and sublimates into ice fog, which can be readily removed from the envelope of the airship.

SUMMARY OF THE INVENTION

In light of the foregoing, it is a first aspect of the present invention to provide a dehumidification system for an airship.

It is another aspect of the present invention to provide a dehumidification system associated with an airship, comprising an envelope enclosing at least a volume of air and a dehumidifier adapted to be coupled to the envelope, wherein the dehumidifier dehumidifies the volume of air.

Yet another aspect of the present invention is a method of preventing water vapor from entering a liquid phase during an ascent of an airship comprising providing an airship having an envelope containing air, selecting a dew point temperature that prevents water vapor in the envelope of the airship from entering the liquid phase during an ascent, and dehumidifying the air within the airship to the selected dew point temperature, wherein during ascent of the airship, the remaining water vapor does not enter a liquid phase.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
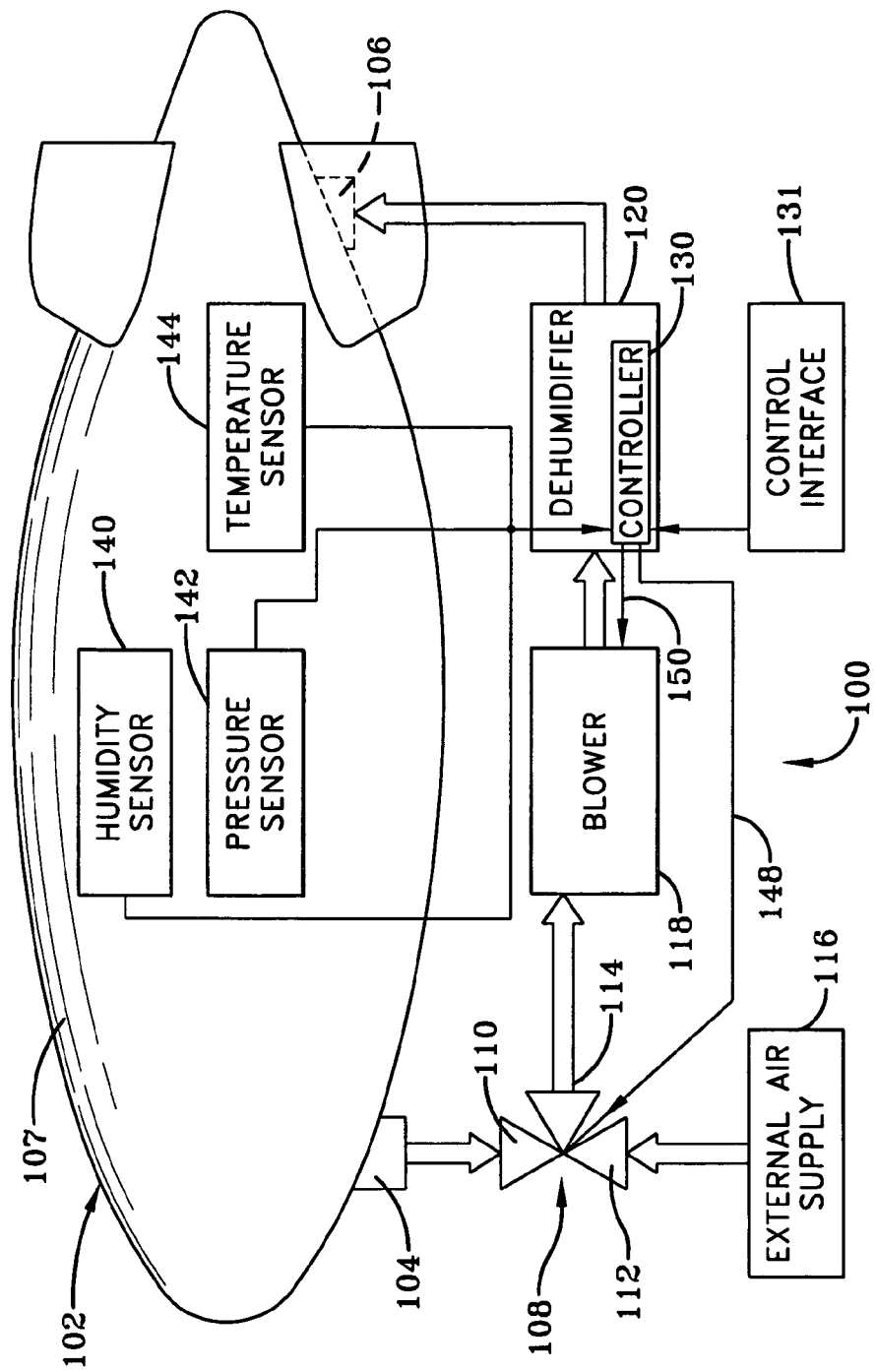
FIG. 1 is a schematic diagram of a dehumidification system coupled to an airship according to the present invention.

A dehumidification system for an airship is generally designated by the numeral 100 as shown in FIG. 1 of the drawings. It should be appreciated that the airship may comprise a high altitude or conventional type airship 102, which may also be referred to as a blimp, aerostat or a lighter-than-air vehicle. The dehumidification system 100 is attached to an airship 102 via an outlet valve 104 and an inlet valve 106. The valves 104 and 106 are coupled to the airship so as to allow for air—either ambient or from a trusted source—to be inserted into and exhausted from the airship. The airship 102 comprises a rigid or pressure-stabilized envelope 107 that is configured to contain various gases, such as air and helium allowing the high altitude airship to ascend and descend.

Attached to the outlet valve 104 is a three-way pressurizer valve 108 that has two input ports 110 and 112 and one output port 114. The three-way pressurizer valve 108 is able to selectively switch on/off each port 110,112,114, and is able to throttle the flow of air through input ports 110 and 112 in varying amounts to the output port 114. A flexible and/or removable connection is made between the airship outlet valve 104, and the input port 110 of the three-way pressurizer valve 108. The output port 114 of the three-way pressurizer valve 108 is coupled to a blower 118. The remaining input port 112 of the three-way pressurizer valve 108 draws air from an external air supply 116. The external air supply 116, may comprise ambient air, air stored in a tank, or air obtained from any other source. The blower 118 is configured to maintain a set positive pressure within the envelope 107 by drawing air through the three-way pressurizer valve 108.

Briefly, the high altitude airship 102 discussed herein is reliant on having the pressure within the envelope 107 constantly maintained in order to keep its shape. Should the internal pressure of the envelope 107 drop below a certain threshold, significant damage could result to both the envelope 107 and any structures attached thereto. Thus, it is ideal that the envelope 107 is maintained at or near a suitable positive pressure value. To this end, the pressurizer 108, using air from the external air supply 116 and in conjunction with the blower 118, coact to maintain positive pressure within the envelope 107 of the high altitude airship 102.

A dehumidifier 120 is attached to the output of the blower 118 and receives air therefrom. The dehumidifier 120 may comprise a condensing type dehumidifier or other suitable dehumidifier system. The dehumidifier 120 is controlled by a controller 130 that comprises a logic control that may be implemented using a general purpose, or application specific semiconductor based microprocessor/microcontroller that provides the necessary hardware, software, and memory to carry out the desired functions to be described. The controller 130 adjusts its level of dehumidification based on the input from a control interface 131 coupled to the controller 130. This control interface 131 may comprise a pushbutton system with a viewable display.

Various sensors are coupled to the controller and are used to monitor the various characteristics of the air within the envelope 107. Specifically, the sensors may comprise at least a humidity sensor 140, a pressure sensor 142, and a temperature sensor 144. The humidity sensor 140 monitors the amount of humidity, or water vapor in the air contained within the envelope 107. The pressure sensor 142 monitors the pressure within the envelope 107. And the temperature sensor 144 measures the temperature within the envelope 107. Collectively, the data from the sensors 140-144 allow the dehumidifier 120 to operate in the manner necessary to achieve the level of dehumidification or drying that was input to the control interface 131 by a user. Based upon the inputs received from the control interface 131 and the sensors 140-144, the controller 130 generates a pressurizer valve control signal 148 received by the pressurizer valve 108 and a blower control signal 150 received by said blower 118. The signal 148 enables the controller to adjust the valve 108 and the amount of air drawn in from the external air supply 116 and the blower control signal 150 controls the amount and/or velocity of the air passing through the dehumidifier. Accordingly, as the envelope 107 is pressurized, the amount of air from the external air supply is reduced and the air contained within the envelope is continually re-circulated until the desired dew point is attained. The output of the dehumidifier 120 is connected to the inlet valve 106 that allows the dehumidified or dried air to be transferred back into the envelope 107.

It should be appreciated that due to the structure of airships, a nominal amount of air is continually lost from various areas about the envelope 107. To prevent the envelope 107 from deflating to a degree that would cause it damage, external air, which may contain water vapor, is supplied to the airship 102 as previously discussed. At least initially, a large amount of water vapor may be contained within the envelope 107. As the pressurization of the envelope is maintained, the air is recirculated through the dehumidifier and the amount of water vapor is reduced. The size and capacity of the blower 118 and dehumidifier 120 are generally selected to provide the desired amount of dehumidification to achieve low dew point temperatures in a suitable amount of time.

In one embodiment of the dehumidification system 100, the blower 118 may be integrated into the dehumidifier 120 or may comprise a separate unit. Additionally, it is contemplated that the dehumidification system 100 may comprise a mobile unit that can be transported to the airship 102 as needed, or may comprise an onboard unit that is placed aboard the airship 102 to provide dehumidification throughout the flight of the airship 102.

During the operation of the dehumidification system 100, the humid, undried air from the envelope 107 is extracted through the pressurizer valve 108 via the outlet valve 104, and routed via the output port 114 to the blower 118. The dehumidifier 120, via the controller 130, processes the data received from the humidity sensor 140, the pressure sensor 142, and/or the temperature sensor 144 to provide the level of dehumidification corresponding to a desired dew point temperature entered via the control interface 131. Specifically, a dew point temperature is selected, which will prevent the air from condensing, or entering a liquid phase, during an ascent, which will be discussed more fully later. The blower 118 forces the dried air through the dehumidifier 120 through inlet valve 106 and back into the envelope 107 of the airship 102. It should also be appreciated that during the dehumidification process, the pressurizer valve 108, in response to a drop in envelope pressure, may extract undried air from the external air supply 116 for routing to the blower 118. The air from the external air supply 116 may be combined with air pulled from the envelope 107 via outlet valve 104 before it is dehumidified by the dehumidifier 120. Alternatively, only air from the envelope 107 or only external air from the external air supply 116 may be processed by the dehumidifier 120 for return to the airship 102 via inlet valve 106.

Figure 2:
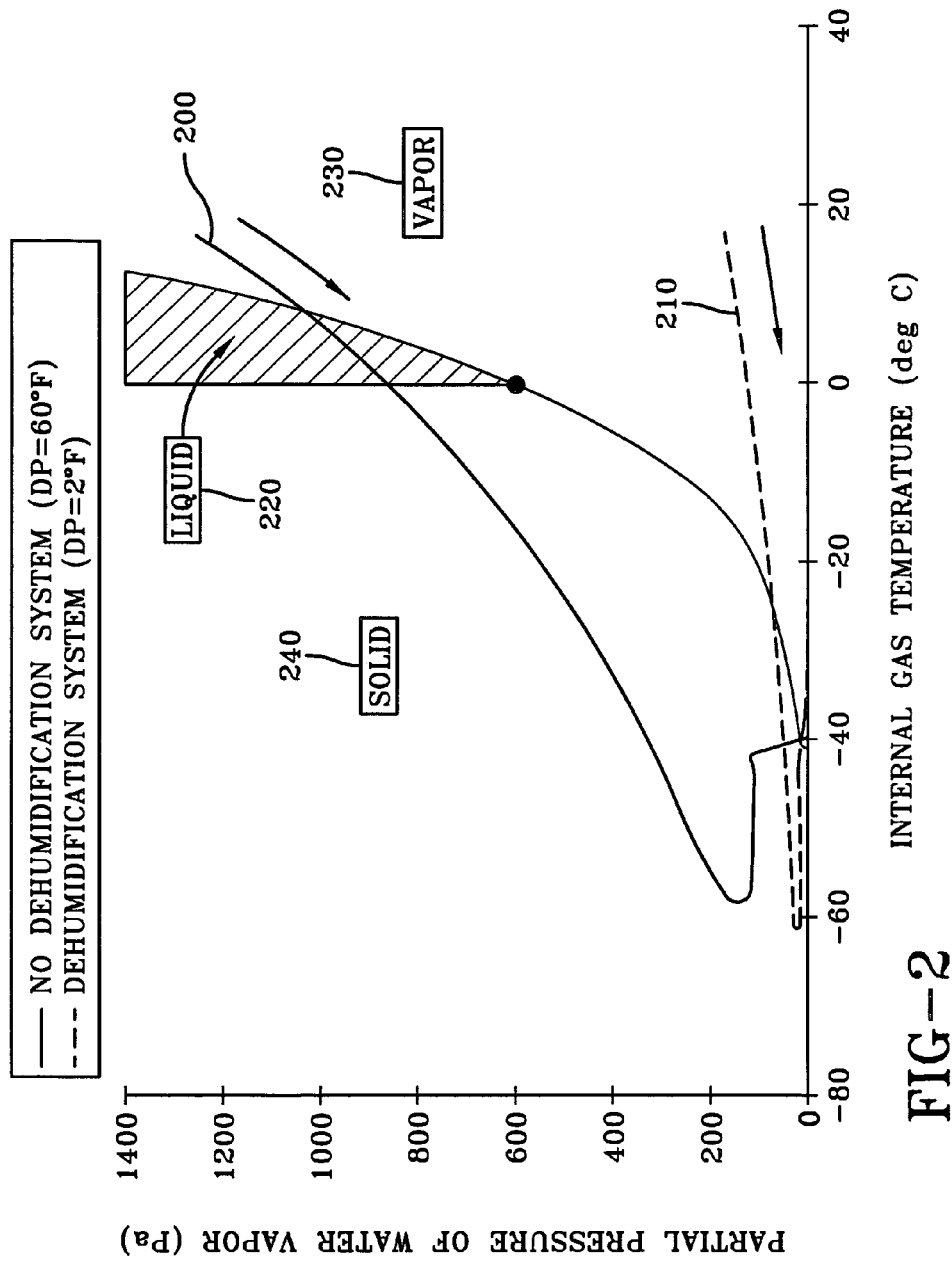
FIG. 2 is an exemplary diagram, wherein the liquid phase is avoided when the air within the envelope of the airship is dried to a suitable dew point temperature.

Even though the air within the envelope 107 of the airship 102 has been dried or dehumidified to a desired dew point temperature, water vapor may still remain. However, by dehumidifying the air to a sufficiently low dew point temperature so as to avoid the liquid phase during ascent allows the remaining water vapor to sublimate directly to ice crystals or "ice fog," rather than condense into water. As shown in the graph of FIG. 2, for example, air within two exemplary airships is dried or dehumidified to different dew point temperatures, and the airships ascend to the same altitudes. The air within one airship 200 has been dehumidified to a dew point of 50 degrees Fahrenheit, while the air contained within a second airship 210 has been dehumidified to a dew point of 2 degrees Fahrenheit. The vertical axis of the phase diagram indicates the partial pressure of the water vapor that is within the envelope of each airship 200,210. Briefly, the total pressure of the gases within the envelope of the airships 200,210 includes all of the partial pressures of the constituent gases that comprise air including the partial pressure of the water vapor. As shown in FIG. 2, prior to an ascent, the air of the airship 200 that was dried to a dew point of 50 degrees Fahrenheit (solid line) has a much higher water vapor partial pressure than the air of the airship 210 that was dried to a dew point of 2 degrees Fahrenheit (dashed line). In other words, prior to ascent the air in the airship 200 dried to a 50 degree Fahrenheit dew point temperature has more water vapor than that of the air in the airship 210 dried to a 2 degree Fahrenheit dew point temperature. Furthermore, the solid line representing the air within the airship 200 with the 50 degree dew point 200 passes through a liquid phase 220 during an ascent, whereas the air within the airship 210 with the 2 degree dew point 210 does not pass through the liquid phase 220 during ascent. Thus, by lowering the dew point temperature of the air within the envelope 107 (i.e. reducing the partial pressure of water vapor within the envelope) to a suitable temperature prior to an ascent of the airship 102, the liquid phase of the water contained within the air can be avoided. In addition to avoiding the liquid phase, sublimation (the passing from the vapor phase 230 directly to the solid phase 240) of any remaining water vapor within the envelope 107 not removed prior to an ascent will take place at a suitable altitude, resulting in ice fog. By converting the water vapor to a solid form, such as ice fog, it is much easier to expel from the envelope 107 via the outlet valves 104 or other suitable valves, such as butterfly valves (not shown) that may be disposed about the envelope 107.

Figure 3:
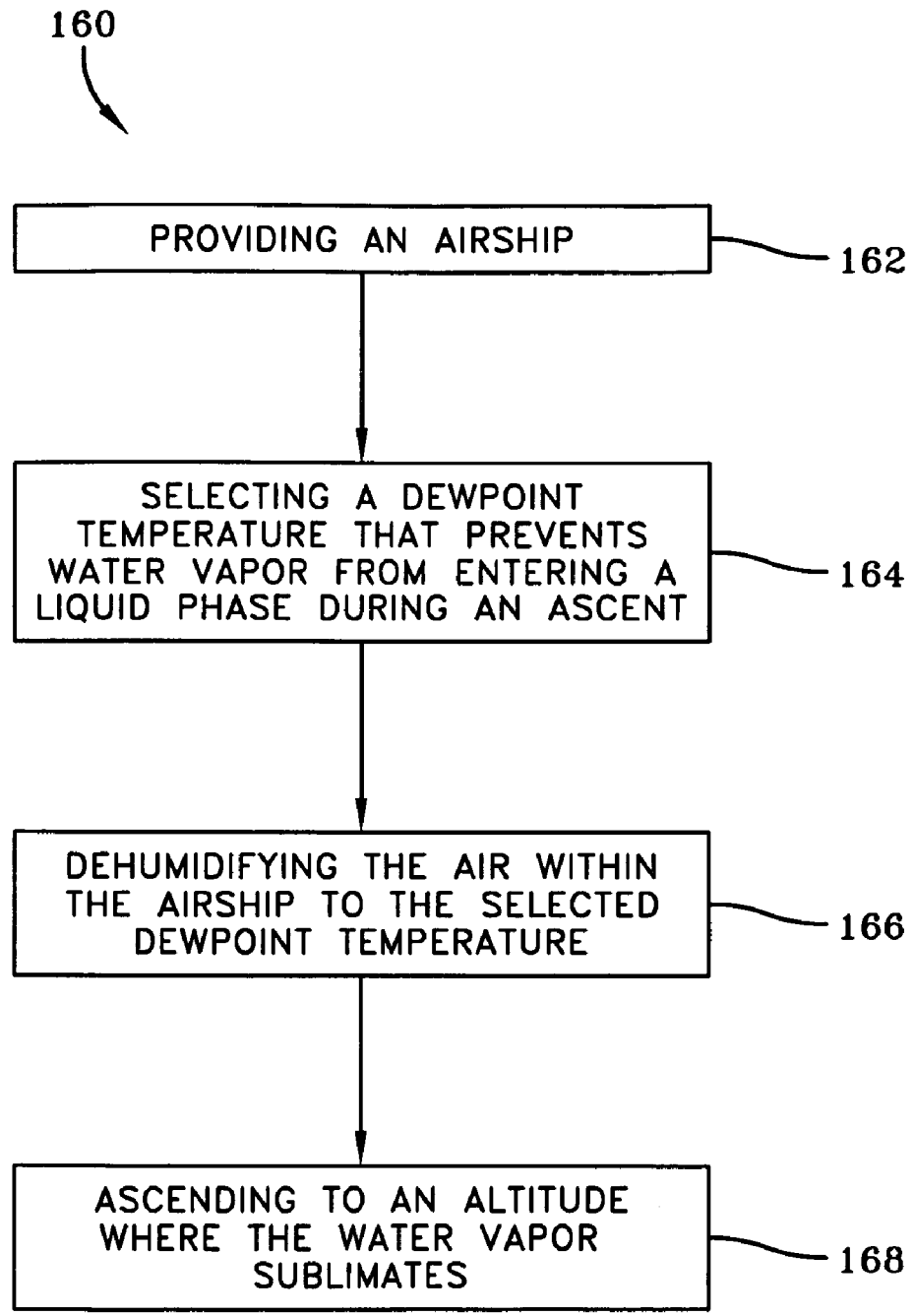
FIG. 3 is a flow chart showing the steps taken to prevent the water vapor contained in the envelope of the airship from having a water phase during an ascent.

Specifically, the operational steps for dehumidifying air are generally indicated by the numeral 160, as shown in FIG. 3 of the drawings. These steps enable the system 100 to ensure that the water vapor in the air of the envelope 107 avoids the liquid phase and directly sublimates into ice fog. At step 162, an airship 102 is provided and connected to the dehumidification system 120 and associated components. A desired dew point temperature is selected at step 164 and input via the control interface 131. The dew point temperature is selected such that any water vapor in the air of the envelope 107 is sublimated, or converted into a solid form such as ice fog or ice crystals at the appropriate temperature change. Once the appropriate dew point temperature is selected, the air within the envelope 107 is dehumidified to the selected dew point temperature via the dehumidification system 100 previously discussed, as indicated in step 166. Finally, at step 168, once the air is dehumidified, and, if appropriate, the dehumidifier and associated components are disconnected and the airship 102 is able to ascend to the desired altitude without the water vapor within the envelope 107 condensing or entering a liquid phase.

In one embodiment of the dehumidification system 100, the air within the envelope 107 may be dried to a dew point temperature of about 35 degrees Fahrenheit or below to prevent the water vapor in the envelope 107 from condensing.

It will, therefore, be appreciated that one advantage of one or more embodiments of the present invention is that a dehumidification system is able to remove a large amount of weight in the form of water vapor from the envelope of an airship, allowing it to ascend to greater altitudes. Still another advantage of the present invention is that the dehumidification system reduces the amount of water and ice that may become trapped within the envelope of the airship during an ascent. An additional advantage of the present invention is that water vapor in the envelope is converted to ice fog that is easily removed from the envelope during an ascent of the airship.

Although the present invention has been described in considerable detail with reference to certain embodiments, other embodiments are possible. Therefore, the spirit and scope of the appended claims should not be limited to the description of the embodiments contained herein.

What is claimed is:

1. A method of preventing water vapor from entering a liquid phase during an ascent of an airship comprising:
   providing a lighter-than-air airship having an envelope containing air;
   selecting a dew point temperature that prevents water vapor in said envelope of said airship from entering the liquid phase during an ascent;
   dehumidifying the air within said airship to the selected dew point temperature, wherein during ascent of said airship, the remaining water vapor does not enter a liquid phase;
   ascending to an altitude wherein the water vapor sublimates, forming an ice fog;
   and expelling said ice fog from said airship.

2. The method of claim 1, wherein said selected dew point temperature is below about 35 degrees Fahrenheit.

* * * * *